Figure 1:
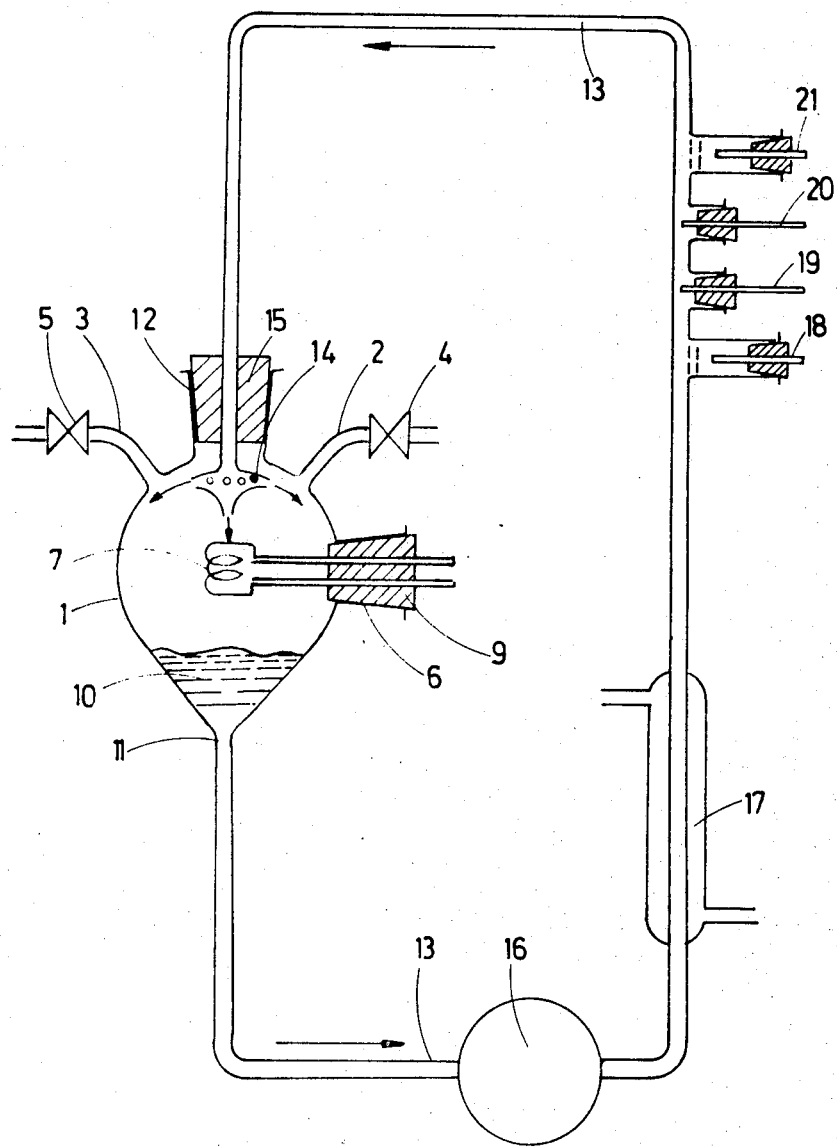

United States Patent [19]
Pont

[11] 3,716,334
[45] Feb. 13, 1973

[54] DETERMINATION OF ELEMENTS IN ORGANIC COMPOUNDS

[75] Inventor: Michel Pont, Saint-Fons, France
[73] Assignee: Rhone-Poulenc S.A., Paris, France
[22] Filed: Feb. 12, 1971
[21] Appl. No.: 114,767

[30] Foreign Application Priority Data

| Feb. 16, 1970 | France | 7005445 |
| Jan. 4, 1971 | France | 7100030 |

[52] U.S. Cl. ........23/230 PC, 23/230 M, 23/253 PC, 204/1 T, 204/195 T
[51] Int. Cl....G01n 27/26, G01n 31/06, G01n 31/12
[58] Field of Search........23/230 PC, 230 M, 253 PC; 204/1 T, 195 T

[56] References Cited

UNITED STATES PATENTS

| 3,529,937 | 9/1970 | Ihara et al | 23/253 PC |
| 2,760,922 | 8/1956 | Williams, Jr. | 204/1 T |
| 3,305,468 | 2/1967 | Liesch | 204/195 T |
| 3,168,377 | 2/1965 | Williams, Jr. | 23/230 PC |

OTHER PUBLICATIONS

A. M. G. MacDonald, "The Oxygen Flask Method," The Analyst, Vol. 86, No. 1018, pages 3–12 (January, 1961). OD71.A45.

*Primary Examiner*—Joseph Scovronek
*Attorney*—Stevens, Davis, Miller & Mosher

[57] ABSTRACT

Apparatus for the rapid and automatic determination of elements such as halogen and sulphur in organic compounds comprises a closed vessel; means for introducing into said vessel and for supporting in said vessel a sample of said compound to be analyzed; means for filling said vessel with oxygen; means for causing combustion of said sample; means for causing circulation of an absorption liquid in a closed circuit including said vessel; means for determining and detecting said element to be analyzed in said absorption liquid; means for causing said absorption liquid to contact during the circulation thereof the inner surfaces of said vessel and said means for supporting said sample; and means for causing said circulation to cease when said determination is complete.

8 Claims, 3 Drawing Figures

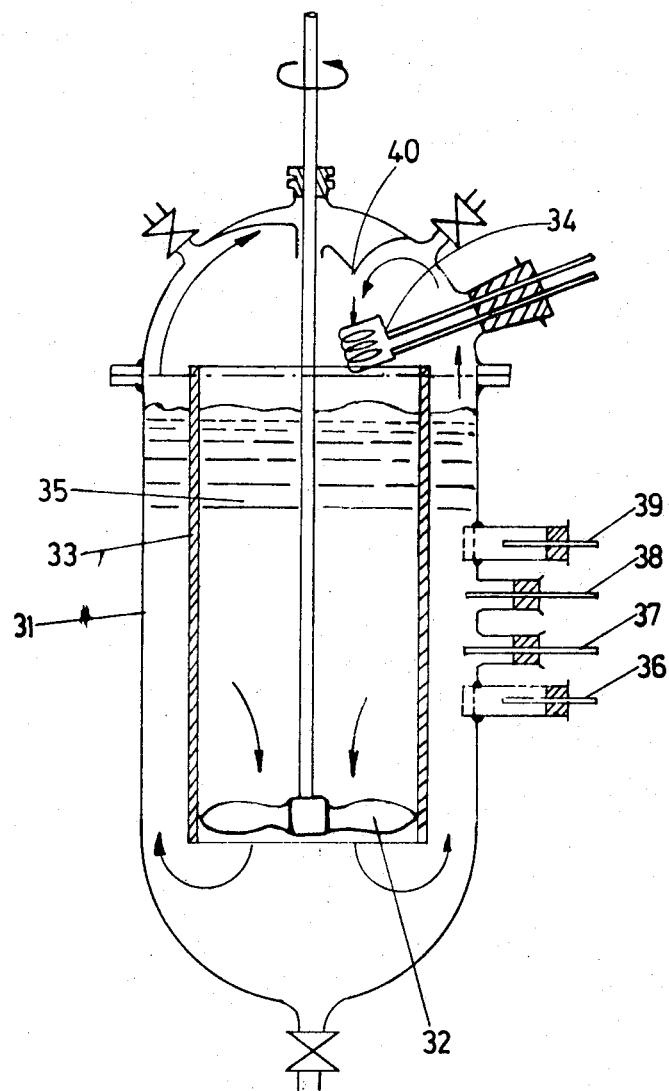

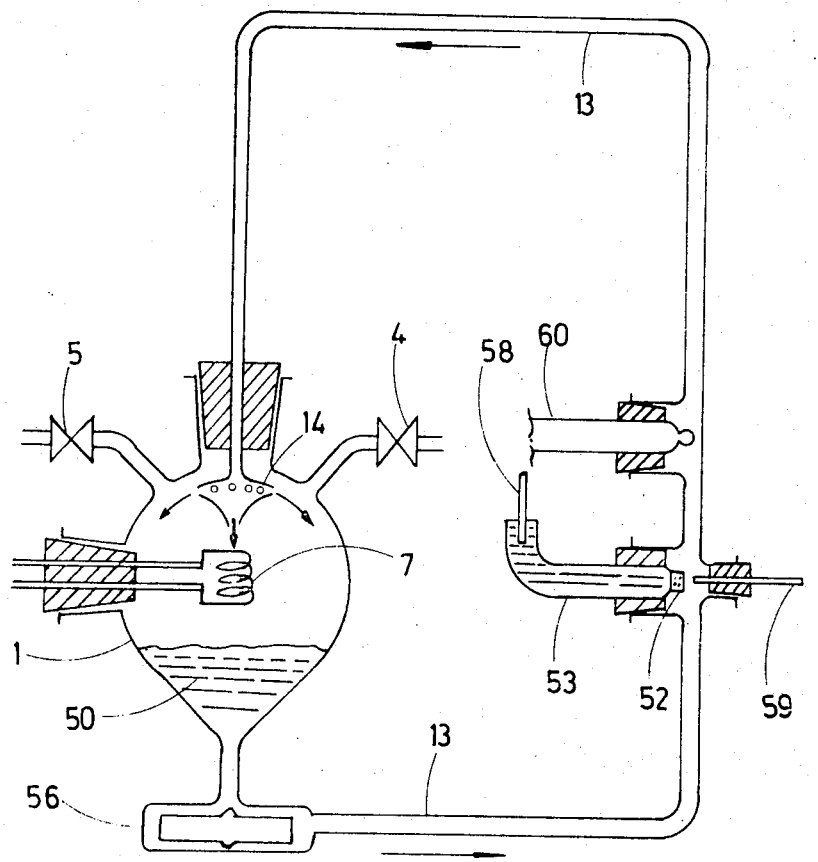

DETERMINATION OF ELEMENTS IN ORGANIC COMPOUNDS

The present invention provides a rapid and automatic method for carrying out the quantitative elementary analysis, in a closed chamber full of oxygen, of elements such as the halogens (especially chlorine, bromine, and iodine) and sulphur in organic compounds. This process is especially suitable for elementary analysis on the decimilligram scale. The invention also provides an apparatus for the process.

It is frequently necessary to carry out the determination of halogens and sulphur, especially in the chemical and related industries. For example, determinations of chlorine are frequently carried out in the manufacture of copolymers based on vinyl chloride.

The best-known methods of analysis require that the halogens and sulphur should first be converted into inorganic compounds. In one such method, called the Schoniger method, the compound to be analyzed is burnt in a closed chamber full of oxygen. This closed chamber method is well suited to a variety of determinations [see "The oxygen flask method" by A. M. G. MACDONALD in The Analyst, January 1961, 3 to 12, and "Sur la technique de Mineralisation de SCHONIGER" ("On the SCHONIGER technique of conversion to inorganic compounds") by M. REVERCHON in Chimie Analytique, volume 44, No. 8. August 1962]. However, this method has not previously been operated automatically.

The present invention provides a method for the quantitative analysis of elements such as the halogens and sulphur in organic compounds, rapidly and automatically, which comprises converting by combustion a known quantity of said compound into inorganic compounds in a zone containing oxygen and an absorption liquid, causing the said absorption liquid to contact said inorganic compounds, analyzing the said element in said absorption liquid which has contacted said inorganic compounds, and causing the said absorption liquid to cease to contact said inorganic compounds when said analysis is complete.

As generally operated, the new method comprises converting a known quantity of the said compound into inorganic compounds by combustion on a carrier in a flask containing an absorption liquid in its lower part and oxygen in its upper part, causing the said absorption liquid to circulate in a closed circuit and contact the walls of the said flask and the said carrier thereby absorbing said inorganic compounds, passing said circulated absorption liquid through a zone wherein the element to be analyzed is detected and determined in said liquid, and causing said circulation to cease when the said determination is complete.

The new method is conveniently carried out in an apparatus which comprises:
a closed vessel;
means for introducing into said vessel and for supporting in said vessel a sample of said compound to be analyzed;
means for filling said vessel with oxygen;
means for causing combustion of said sample;
means for causing circulation of an absorption liquid in a closed circuit including said vessel;
means for determining and detecting said element to be analyzed in said absorption liquid;
means for causing said absorption liquid to contact during the circulation thereof the inner surfaces of said vessel and said means for supporting said sample; and
means for causing said circulation to cease when said determination is complete.

Such an apparatus can be connected to devices which cause the determination to be effected in a programmed manner, and further to devices which cause the results of the analysis to be measured, recorded and examined.

In more detail the new method is carried out in the following preferred manner, which refers to the case of the elementary analysis, on the decimilligram scale, of an organic product containing a halogen. The material on which the determination is to be carried out, which may be solid or liquid, is weighed on a precision balance into an envelope of negligible blank value (that is to say containing nothing which can influence the result of the determination); this envelope can for example be made of poly(ethylene glycol terephthalate). The weight of the sample is generally between 100 and 2,000 $\mu$g depending on the content of the element to be determined in the sample. The sealed envelope, containing the material to be analyzed, is placed on a carrier which is introduced into the flask. The latter contains a reducing absorption liquid in its lower part. The flask and its charge are purged with oxygen. The envelope containing the sample is ignited by any appropriate means, for example by heating to redness an electrical resistance which constitutes the carrier itself, the ends of which are connected to an appropriate current supply; and the combustion is allowed to go to completion. The sample is thus converted into inorganic compounds. The duration of this operation is generally between 0.1 and 10 seconds. The absorption liquid is then caused to circulate in a closed circuit and the walls of the flask, and the sample carrier are sprinkled with this liquid. This closed circuit circulation can be achieved by any appropriate means, for example by a pump, a propeller, a stirrer, an oscillating device and the like. The circulation of the absorption liquid simultaneously causes the sprinkling of the walls of the flask and of the sample carrier, the absorption and reduction of the combustion products, and the homogenization of the liquid phase. The circulating liquid now contains halide ions. It is circulated through the flask several times, the circulation time being generally between 10 seconds and 30 minutes and preferably between 1 and 10 minutes. The speed of circulation of the liquid in contact with devices for determination and detection of halide ions is generally between 1 cm/second and 100 cm/second, and preferably between 10 and 50 cm/second. The halide is determined by any known process, for example by coulometric determination or volumetric determination, and detection may be, for example, by potentiometric (zero-current or imposed current) or amperometric means. Colorimetry can also be employed. The detection apparatus indicates the end of the determination and gives a signal for stopping the circulation of the absorption liquid. The next analysis can then be carried out, and the absorption liquid can generally be reused for a certain number of consecutive determinations. Where halogen is being determined by coulometric deposition as silver halide, it is necessary to shield the liquid and the silver halide from light to avoid photo-decomposition of the silver halide.

Each operation of the new method can be controlled manually or by an appropriate automatic programming device. Even with manual operation up to 12 determinations per hour can be carried out (not counting the time for weighing), compared with only three by prior art methods.

The new method can, of course, be applied to the determination of elements other than halogens. Thus, the method is applicable to the determination of any element which can be converted into an inorganic compound by combustion in oxygen, e.g. sulphur, using an appropriate absorption liquid and appropriate means of determination and detection.

The three Figures of the accompanying drawings show three forms of the apparatus of the invention. The drawings are not to scale. FIGS. 1 and 2 show preferred embodiments especially suitable for determination of halogens. FIG. 3 shows a particularly valuable embodiment especially suitable for the determination of sulphur.

The apparatus shown in FIG. 1 comprises a flask 1, for example of glass, conveniently of between 10 and 100 cm$^3$ volume, and of a spherical shape slightly elongated towards the bottom. This flask 1 is equipped with two tubes 2 and 3 on each of which there is provided a tap 4 and 5 for filling with oxygen and purging out the air. The flask 1 is provided with an orifice 6 which permits the introduction of the sample to be analyzed, placed in a sealed envelope (not shown) on the carrier 7, which for example consists of several turns of platinum wire. This platinum wire is heated to redness for a moment by connecting the ends of it to a source of current and applying a potential, and this allows the envelope and the sample in it to be ignited. The carrier 7, located above the absorption liquid 10, is centered in the flask by means of a stopper 9. The flask has two orifices, a lower orifice 11 and an upper orifice 12, connected by a tube 13 outside the flask; this tube can consist of various materials, such as glass, polyvinyl chloride or a silicone elastomer. A pump 16 can be provided on this tube. This pump can be of the peristaltic type if the corresponding part of the tube 13 is made of a flexible material such as a silicone elastomer. Preferably, a centrifugal pump is used, especially if the tubes are made of glass.

A circuit is thus formed, through which the absorption liquid flows in the direction shown by the arrows. When the absorption liquid 10 enters the flask, in its upper part, it sprinkles the walls of the latter, and the carrier 7, by virtue of the appropriate shape, for example like a sprinkler head, of the device 14 which is centered on the stopper 15. On the tube 13 for the circulation of the absorption liquid there are located, for example in the case of coulometry, determination electrodes 18 and 19 connected to a direct current generator (not shown), and electrodes 20 and 21 connected to known detection apparatus (not shown). The group of electrodes can be placed anywhere in the circuit. Where appropriate, a heat exchanger 17 can also be provided. The apparatus can if necessary be shielded from light, for example by being placed in a box (not shown).

In FIG. 1 the various electrodes are shown as being located in the circuit through which the absorption liquid flows, in various planes which are substantially at right angles to the axis of circulation of the liquid. However, the determination electrodes and detection electrodes can also all be placed in one and the same plane which is substantially at right angles to the axis of circulation of the liquid. Such an arrangement is shown in FIG. 3, described in detail below, which is otherwise generally similar to FIG. 1.

Of course, if a non-electrical method of determination, such as colorimetry, is used, the electrodes can be omitted, and the appropriate determination apparatus is then included in the liquid circulation circuit.

FIG. 2 shows schematically an alternative embodiment of the apparatus of the invention. This apparatus is in the shape of a vertical cylindrical cell 31 with rounded ends. It is provided internally with a cylindrical wall 33 concentric with the lateral wall of the cell, and spaced away from the latter by ties which are not shown. A propeller 32 is located in the absorption liquid 35, at the bottom of the internal cylinder 33; this propeller 32 is driven mechanically or electromagnetically by any appropriate known means. When the propeller 32 is rotated rapidly, the absorption liquid 35 circulates in a closed circuit in the direction indicated by the arrows, sprinkling the upper part of the flask and the sample carrier 34, by virtue of a drip device 40. The determination electrodes 36 and 37 and detection electrodes 38 and 39 are located laterally, as shown in FIG. 2.

An alternative method of igniting the sample on the sample carrier 7 or 34 consists of placing near the flask 1 or 31 a lamp equipped with an optical device, such as a spherical mirror, which focuses the radiation from the lamp onto the sample placed on its carrier. By switching on the lamp, the sample is caused to ignite without having to heat the carrier to redness.

These apparatuses allow rapid and precise analyses to be carried out without previous start-up, as is shown by the following Examples.

EXAMPLE 1

Chlorine is determined in chlorothiazide, of overall formula $C_7H_6O_4N_3S_2Cl$ (1,1-dioxo-6-chloro-7-sulphamoyl-benzo-1-thia-2,4-diazine).

The apparatus used is that shown in FIG. 1; it is shielded from light by placing inside a box. The heat exchanger 17 is not used. The volume of the flask 1 is 60 cm$^3$. The absorption liquid circuit 13 consists of glass tubes of 2 mm internal diameter, and silicone elastomer tubes of 3 mm internal diameter.

The determination is carried out by the coulometric method using electrodes 18 and 19 and the detection by the potentiometric method using electrodes 20 and 21. The electrode 18 is of platinum and dips into a solution of potassium sulphate, separated from the circuit by a porous partition; the electrode 19 is of silver. These two electrodes 18 and 19 are connected to the coulometric determination apparatus. The indicator electrode 20, which is of silver, and the reference electrode 21, of mercurous sulphate, are connected to the potentiometric detection apparatus. The determination electrode 19 is close to, and upstream from, the indicator electrode 20, as shown in FIG. 1 (with the absorption liquid circulating in the direction of the arrows). This arrangement makes it possible not to exceed the end point of the determination, i.e. the coulometric determination is stopped immediately as the electrodes 20 and 21 indicate a predeterminate concentration of $Ag^+$ ions in the absorption liquid.

An analysis is carried out as follows. First, 15 cm³ of a reducing absorption solution are introduced into the flask; the solution is made up by mixing 25 cm³ of an aqueous solution of potassium hydrogen sulphate (pH = 1.4), 25 cm³ of an 0.4 percent by weight aqueous solution of hydrazine sulphate and 1 cm³ of an 0.3 percent strength solution of gelatine in water-methanol (3 volumes of water per 7 volumes of methanol). The sample to be analyzed is weighed into a poly(ethylene glycol terephthalate) envelope and the envelope is sealed with hot nitrogen (the envelope is produced from a film of 50 microns thickness and weighs 2.5 ± 0.5 mg). The sealed envelope, containing the sample, is now placed on the carrier 7 and introduced into the flask 1, and the taps 4 and 5 are operated so as to fill the flask with oxygen. These taps are closed, and the platinum coil of the carrier is subjected to an electric potential so as to bring it to redness for just sufficiently long to cause the envelope and the sample to ignite. When the combustion is complete, the peristaltic pump 16 and the determination and detection systems are started.

The circulation of the absorption liquid causes the flask and the carrier to be sprinkled, and the halide to be homogeneously distributed in the absorption liquid and accurately determined. The determination stops automatically at the end point, signalled by the detection apparatus comprising electrodes 20 and 21 which stops the circulation.

The Table given below summarizes the results the results of the determination of chlorothiazide in the case of 17 successive analyses carried out with the same absorbing solution. The theoretical chlorine content of chlorothiazide is 11.99 percent.

| Weight of the sample of chlorothiazide in µg | Chlorine % Found |
|---|---|
| 950.6 | 11.99 |
| 484.2 | 11.97 |
| 793.9 | 11.95 |
| 842.7 | 11.97 |
| 658.1 | 12.00 |
| 619.0 | 11.99 |
| 1455.6 | 11.96 |
| 548.7 | 11.99 |
| 829.8 | 12.03 |
| 915.5 | 12.00 |
| 678.7 | 11.98 |
| 1008.7 | 12.00 |
| 616.6 | 11.99 |
| 1367.3 | 11.99 |
| 692.4 | 11.96 |
| 837.3 | 12.02 |
| 1115.1 | 12.00 |

These 17 operations require only 1 hour and 30 minutes (excluding the time of weighing). The same series of determinations carried out by the conventional method, without recirculation of the absorption liquid, require 6 hours.

EXAMPLE 2

The determination of bromine in p-bromobenzoic acid, $C_7H_5O_2Br$, is carried out. The same apparatus as in Example 1, and an absorbing solution of the same composition and in the same amount as in Example 1, are used. As the determination takes place at 35°C., the heat exchanger 17 is used. The procedure is in all respects similar to that described in Example 1.

The Table below summarizes the results obtained in the case of 10 successive determinations using the same absorbing solution. The theoretical bromine content of p-bromobenzoic acid is 39.75 percent.

| Weight of the sample of p-bromobenzoic acid in µg | Bromine % found |
|---|---|
| 431.0 | 39.76 |
| 854.0 | 39.76 |
| 398.4 | 39.79 |
| 677.2 | 39.70 |
| 281.8 | 40.06 |
| 374.4 | 40.06 |
| 372.7 | 39.74 |
| 425.3 | 39.38 |
| 298.1 | 39.46 |
| 456.7 | 39.74 |

These determinations take 1 hour 30 minutes (excluding the time of weighing), while the conventional process without recirculation requires 3 hours 30 minutes.

EXAMPLE 3

The determination of sulphur in dihydroxydiphenyl-sulphone, $C_{12}H_{10}O_4S$, is carried out. The apparatus shown in FIG. 3 is used. The flask 1 has a volume of 60 cm³. The absorption liquid circuit 13 consists of glass tubes of 4 mm internal diameter which form a closed loop, and comprises a centrifugal pump made of glass 56, the rotor of which consists of a bar magnet coated with polytetrafluoroethylene.

The determination is carried out by a coulometric method using electrodes 58 and 59 and the detection by a method in which the pH is measured using glass electrode 60. The electrode 58 of silver dips into a 20 percent aqueous sodium chloride solution contained in a bent tube 53 and kept separated from the circuit 13 by a porous ceramic plug 52. The electrode 59 of platinum is arranged at right angles to the axis of circulation of the absorption liquid, opposite the end of the bent tube 53. The two electrodes 58 and 59 are connected to a coulometric determination apparatus (not shown). The glass electrode 60 (in which a reference electrode and a measuring electrode are grouped together into a single electrode of small size) provides the means of detection. This electrode 60 is connected to a pH-meter (not shown), which controls the coulometric determination apparatus.

The determination electrodes 58 and 59 are arranged upstream from the detection electrode 60, as shown in the Figure. (The absorption liquid circulates in the direction of the arrows). This arrangement makes it possible not to exceed the determination end point.

Analysis is carried out as follows. First, 20 cm³ of an absorbing solution 50 containing 20 percent of sodium chloride in water, and 1 cm³ of 10 percent by weight hydrogen peroxide, are introduced into the flask 1. The sample to be analyzed is weighed into a poly(ethylene glycol terephthalate) envelope which is sealed with hot nitrogen, the envelope being produced from a film 50 microns thick, and weighing 2.5 ± 0.5 mg. The sealed envelope containing the sample is then placed on the carrier 7 and introduced into the flask. The flask is closed, and a programmer (not shown) is started, which automatically triggers the operation of the taps 4 and 5 for filling the flask with oxygen. With these taps closed, the programmer applies a potential to the platinum coil of the carrier 7, so as to heat it to redness for just sufficiently long to ignite the envelope and the sample. When the combustion is complete, the programmer starts the centrifugal pump 56 and the determination and detection systems. The circulation of the absorption liquid causes the walls of the flask, and the carrier 7, to be sprinkled from the device 14 which acts as a sprinkler head. This circulation causes the sulphuric acid formed to be uniformly distributed in the absorption liquid and permits its determination, followed by the detection apparatus which detects the end of the determination, i.e. the return to a predeterminate pH of the circulating liquid.

The Table below summarizes the results of the determination of dihydroxy diphenylsulphone, for 10 successive analyses carried out with the same absorbing solution. The theoretical sulphur content of dihydroxydiphenylsulphone is 12.81 percent.

| Weight of the sample of dihydroxydiphenylsulphone in μg | S, % found |
|---|---|
| 890.8 | 12.97 |
| 550.1 | 12.67 |
| 938.0 | 12.78 |
| 558.7 | 12.78 |
| 684.3 | 12.49 |
| 774.2 | 12.78 |
| 758.7 | 12.56 |
| 478.9 | 12.59 |
| 648.0 | 13.11 |
| 970.3 | 12.71 |

These 10 determinations only require 55 minutes (not including the weighing time). The same series of determinations carried out by a conventional method require 3 hours 30 minutes.

EXAMPLE 4

Sulphur is determined in dimethylsulphoxide $C_2H_6OS$. The same apparatus, and an absorbing solution of the same composition and in the same amount as in Example 3, are used. The process is in all respects similar to that described in Example 3.

The Table below summarizes the results obtained in the case of 10 consecutive determinations, using the same absorbing solution. Dimethylsulphoxide has a theoretical sulphur content of 41.04 percent.

| Weight of the sample of dimethylsulphoxide in μg | S, % found |
|---|---|
| 555.0 | 41.34 |
| 524.2 | 41.27 |
| 528.7 | 41.25 |
| 465.6 | 41.03 |
| 580.7 | 41.35 |
| 486.5 | 41.05 |
| 420.3 | 41.61 |
| 621.9 | 40.93 |
| 612.2 | 41.24 |
| 848.3 | 40.85 |

The 10 determinations take 1 hour (not including the weighing time), while, if the absorption liquid is not recirculated, the time required is 3 hours 30 minutes.

I claim:

1. A method for the quantitative analysis of an element in an organic compound which comprises converting a known quantity of the said compound into inorganic compounds by combustion on a carrier in a flask containing an absorption liquid in its lower part and oxygen in its upper part, causing the said absorption liquid to circulate in a closed circuit and contact the walls of the said flask and the said carrier thereby absorbing said inorganic compounds, passing said circulated absorption liquid through a zone wherein the element to be analyzed is determined and wherein the end-point of the determination is detected, and causing said determination to cease when said end-point is reached.

2. A method according to claim 1 in which the said element is determined electrolytically in said absorption liquid.

3. A method according to claim 1 in which the said element is chlorine, bromine, iodine or sulphur.

4. Apparatus for the quantitative analysis of an element in an organic compound which comprises:
   a closed vessel;
   means for introducing into said vessel and for supporting in said vessel a sample of said compound to be analyzed;
   means for filling said vessel with oxygen;
   means for causing combustion of said sample;
   means for causing circulation of an absorption liquid in a closed circuit including said vessel;
   means for determining said element to be analyzed in said absorption liquid;
   means for detecting the end-point of the determination in said circulating absorption liquid;
   means for causing said absorption liquid to contact during the circulation thereof the inner surfaces of said vessel and said means for supporting said sample; and
   means for causing said determination to cease when said end-point is detected.

5. Apparatus according to claim 4 in which means are also provided for heat-exchanging said absorption liquid during circulation thereof.

6. Apparatus according to claim 4 in which the means for supporting the said sample and the means for causing combustion of the said sample is a platinum wire carrier which can be heated to redness electrically.

7. Apparatus according to claim 4 for the quantitative analysis of a halogen in which the said means for determining said element comprises two electrodes, one of which is made of silver, and the said means for detecting the end-point of the determination comprises two potentiometric electrodes.

8. Apparatus according to claim 4 for the quantitative analysis of sulphur in which the said means for determining comprises two electrodes and the said means for detecting the end-point of the determination comprises 2 electrodes indicating a predetermined pH of the circulating absorption liquid.

* * * * *